C. A. REHM.
GEOGRAPHICAL GLOBE.
APPLICATION FILED MAR. 30, 1908.
930,316.
Patented Aug. 3, 1909.
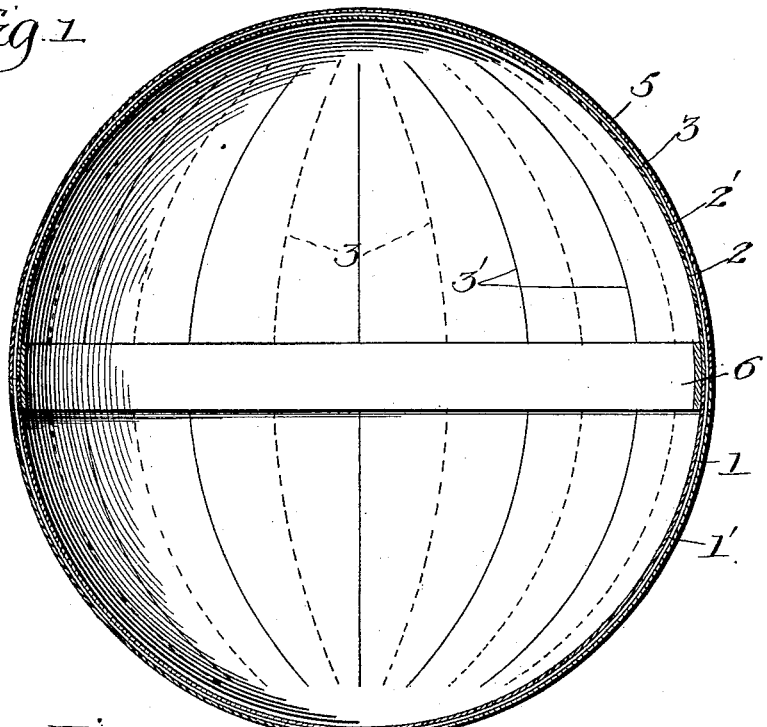
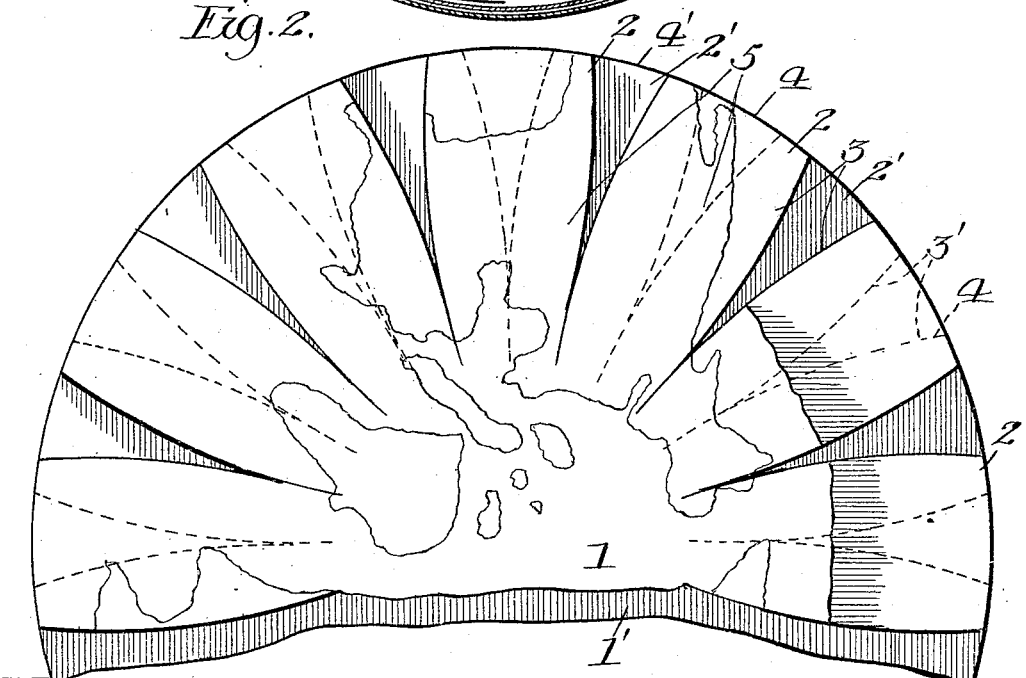
Witnesses
Inventor
Chester A. Rehm
by A. Miller Belfield Atty.

UNITED STATES PATENT OFFICE.

CHESTER A. REHM, OF OAK PARK, ILLINOIS.

GEOGRAPHICAL GLOBE.

No. 930,316.    Specification of Letters Patent.    Patented Aug. 3, 1909.

Application filed March 30, 1908. Serial No. 423,997.

*To all whom it may concern:*

Be it known that I, CHESTER A. REHM, a citizen of the United States, residing at Oak Park, in the county of Cook and State of Illinois, have invented a certain new and useful Improvement in Geographical Globes, of which the following is a full, clear, concise, and exact description, reference being had to the accompanying drawings, forming a part of this specification.

My invention relates to geographical globes, and to the process for making the same, and it relates in particular to the manufacture of geographical globes by making up two separate hemispheres by molding two or more layers of cardboard, or other suitable material, in a hot mold and then securing the two hemispheres together.

The object of the invention is to improve and cheapen this method of making globes, especially in the matter of applying the map.

In accordance with my present invention, I apply the map to the layer of cardboard or other material which becomes the outer layer when the hemisphere is formed up in the mold. In this way the trouble, expense and time of applying the map to the globe after the same has been formed are avoided, and a material saving in all of these points is effected.

In preparing the hemispheres out of two or more layers of material, these layers are desirably cut by dies so as to make a star or sun-flower shaped form, which will be molded in the press so as to bring the radial members or gores into perfect fit together, and in carrying out my invention in connection with this method of forming the hemispheres, I first prepare the map so that it has printed sections corresponding to the star or sun-flower shape of the upper layer of material, and this map is then applied to the sheet of material for the outer layer and die cut or stamped with that sheet of material, so that there is produced a sun-flower or star shaped form, comprising the layer of cardboard and the map applied to it, both of the same star shape, and the map adapted to make a perfect hemisphere when formed up in the mold.

In the accompanying drawings Figure 1 is a vertical section of a globe, constructed in accordance with my present invention. Fig. 2 is a plan view of a portion of a completed form made up preparatory to being formed up in the mold.

Referring first to Fig. 2, 1 have shown two layers 1 and 1' of suitable material, such as cardboard, having radial members or gores 2, 2 and 2', 2', adapted to be formed up to make a hemisphere, the side edges 3, 3 and 3', 3' meeting to form a perfect fit, and the edges 4 and 4' coinciding to form an equator. On the outer layer 1 is a map 5, which corresponds in shape and size with the layer 1, and is secured to said layer by glue or other adhesive substance. This map has first been prepared by printing it with gore shaped printed sections, and it has then been applied to the sheet of material forming the outer layer of the hemisphere and then stamping out the layer and attached map by a die. The layer 1' is below the layer 1, with the gores of the two layers out of register, and glue is placed between the two layers. The two layers in this condition are then put in a hot mold and formed up into a hemisphere, and the heat of the mold dries and hardens the glue and makes the hemisphere solid and rigid.

It will be seen by first applying the map to one of the layers of material and then forming up the hemisphere, a complete mapped hemisphere is made by the process, with no more consumption of time than would be required to form up the hemisphere unmapped, so that the time, expense and trouble of mapping the hemisphere after being formed are completely avoided. It will, of course, be understood that two mapped hemispheres are made in this way, and then secured together to form a complete globe; as for example, placing a ring 6 of cardboard or other material inside of the two hemispheres and gluing it to the equatorial edges of the same.

It will be understood, of course, that changes and modifications can be made without departing from the spirit of my invention.

What I claim for my invention is:

The method of making a hemisphere for geographical globes, consisting in securing a map sheet while in flat or unbended condition to a sheet of material for the globe, cutting said sheets to permit the same to be formed into hemispherical shape, and connecting and forming said sheets with a foundation sheet into hemispherical shape.

In witness whereof, I hereunto subscribe my name this 26th day of March A. D., 1908.

CHESTER A. REHM.

Witnesses:
I. E. KLIPSTEIN,
O. M. NENNICH.